No. 728,181. PATENTED MAY 12, 1903.
W. G. TEMPLETON.
CHEESE CUTTER.
APPLICATION FILED FEB. 17, 1902.
NO MODEL. 2 SHEETS—SHEET 1.
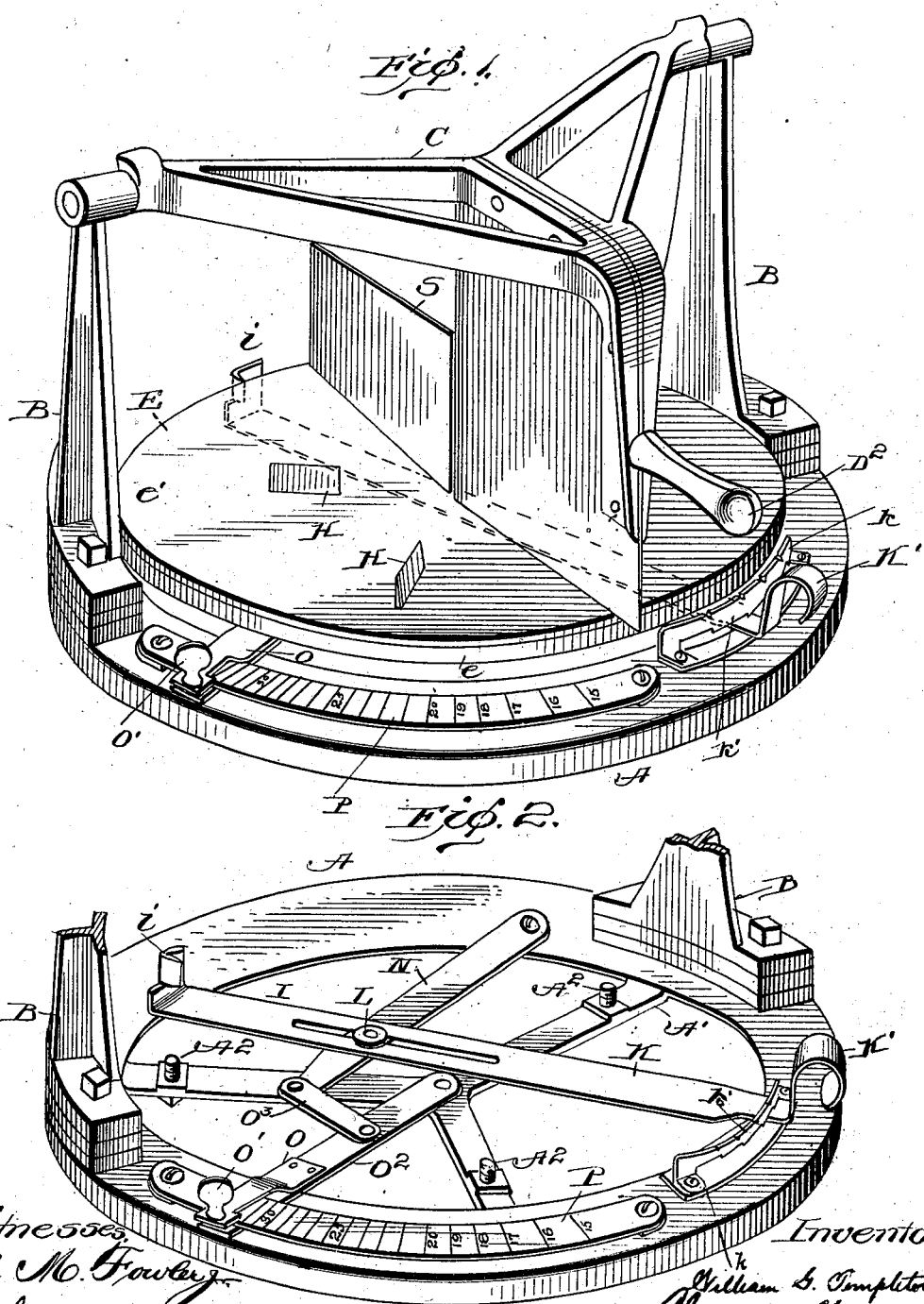

No. 728,181. PATENTED MAY 12, 1903.
W. G. TEMPLETON.
CHEESE CUTTER.
APPLICATION FILED FEB. 17, 1902.
NO MODEL. 2 SHEETS—SHEET 2.
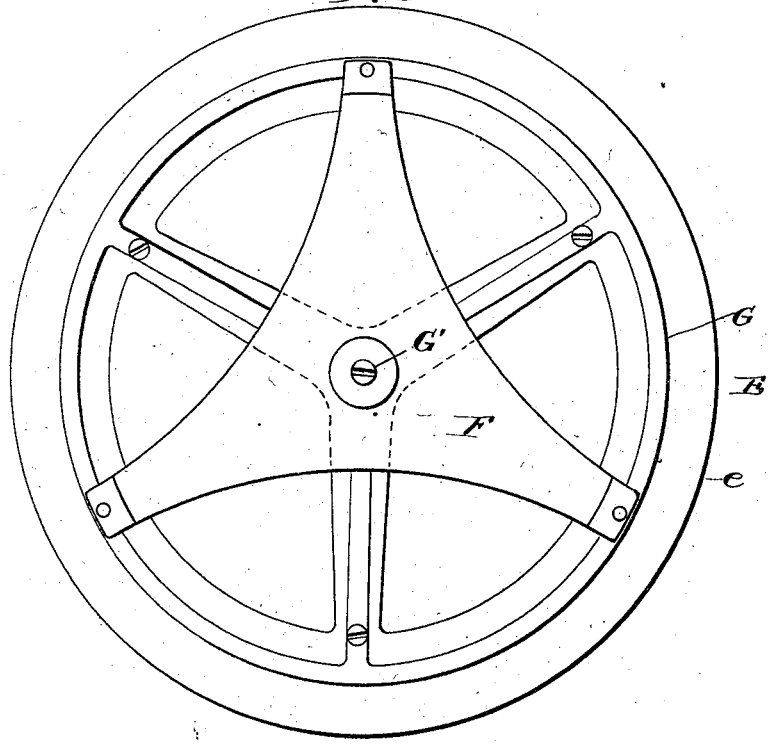
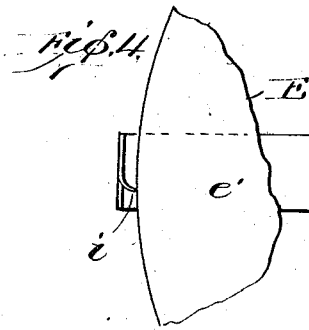
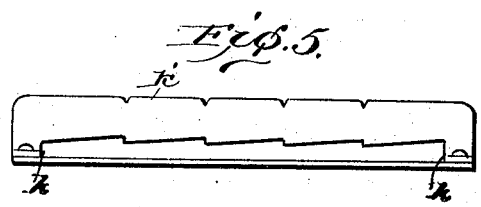
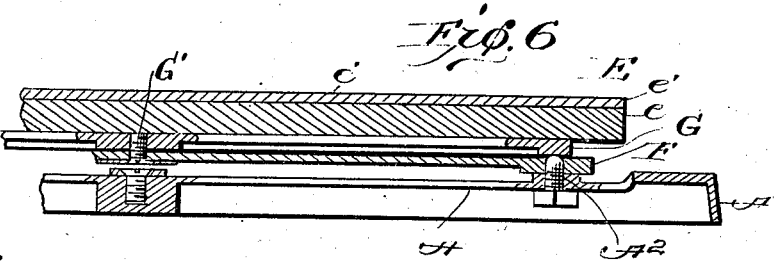
Witnesses:
Inventor
William G. Templeton No. 728,181.

Patented May 12, 1903.

UNITED STATES PATENT OFFICE.

WILLIAM G. TEMPLETON, OF COLORADO SPRINGS, COLORADO.

CHEESE-CUTTER.

SPECIFICATION forming part of Letters Patent No. 728,181, dated May 12, 1903.

Application filed February 17, 1902. Serial No. 94,468. (No model.)

*To all whom it may concern:*

Be it known that I, WILLIAM G. TEMPLETON, of Colorado Springs, in the county of El Paso, State of Colorado, have invented certain new and useful Improvements in Cheese-Cutters; and I do hereby declare the following to be a full, clear, and exact description of the same, reference being had to the accompanying drawings, forming a part of this specification, and to the letters of reference marked thereon.

This invention relates to improvements in that class of apparatus designed for severing a cheese into segmental parts, the objects of the invention being to provide an apparatus of great simplicity wherewith a cheese of any size or weight within the capacity of the apparatus may be divided or subdivided into parts of any desired given weight or size without further attention on the part of the salesman or operator than the preliminary setting of the apparatus in accordance with the total weight of the cheese to be divided or subdivided.

The invention therefore consists, primarily, in a measuring apparatus whereby any desired aliquot part of the cheese may be separated from the body of the cheese, regardless of the particular size or weight of the entire body, such measuring mechanism embodying a means whereby a severing-knife and the cheese may be moved with relation to each other a certain predetermined angular distance by means of a controlling mechanism having a definite throw or movement.

The invention further consists in providing an apparatus having a rotary cheese-support and a mechanism for rotating said support embodying an operating-arm having a variable throw with means for moving said arm and means for determining the throw of said arm in proportion to the total weight of the cheese to be subdivided.

The invention further consists in certain novel details of construction and combinations and arrangements of parts, all as will be hereinafter described, and pointed out particularly in the appended claims.

Referring to the accompanying drawings, Figure 1 is a perspective view of a cheese-cutter embodying the present improvements. Fig. 2 is a similar view of the base with the cheese-support removed. Fig. 3 is a view looking at the under side of the cheese-support. Fig. 4 is a detail showing the clutch connection between the operating-arm and cheese-support. Fig. 5 is a detail view showing the stops and gage for the operating-arm. Fig. 6 is a vertical section through a portion of the base and cheese-support.

Like letters of reference in the several figures indicate the same parts.

The base of the apparatus is usually a casting and is preferably circular in form and of open-work construction—that is to say, there is a circular rim with arms A' projecting radially from a center to said rim, although it will be understood that the base may be of any preferred or desired style or construction. Rising from the base are the standards or knife-supports B, in the upper ends of which the knife-frame C is hinged so as to swing vertically toward and from the base. The knife B', preferably a flat blade, is mounted in the knife-frame, and a suitable handle $D^2$ projects from the front of said frame, whereby the knife may be brought down, so as to sever a cheese mounted on a carrier E on the base below the knife. The carrier E is a rotary carrier, being preferably mounted on a non-rotary spider F, having its arms adapted to coöperate with radial arms A' of the base, the connection between the spider and said arms being formed by set-screws $A^2$, threaded through said arms and projecting through the arms of the spider. In the preferred construction these screws contact directly with the under side of said carrier or with a track or way G on said carrier and centrally connected with the spider by a pin or pivot G'. The carrier itself may consist of a circular disk of wood $e$, having a surface covering or plating $e'$, of vulcanized fiber, to affo d a firm hard wearing-surface with which ..1e edge of the knife may come into contact without injuring said edge. Vulcanized fiber, it is found, is not affected by the dampness or acids of the cheese and affords an exceedingly tough and somewhat elastic surface which will not be quickly scored or worn away by the knife coming into contact therewith.

To insure the rotation and positioning of the cheese on its carrier, a series of flat radial knives or blades H are mounted rigidly on the carrier. In such position, it will be seen, the flat sides of the knives take the pressure of the cheese in rotating and at the same time, said knives being radially disposed on the support, are parallel with the cutting edge of the cheese-knife at the cutting-point, thereby reducing to a minimum the danger of the edges abutting should it so happen that the cut of the knife is in line with one of the blades on the carrier.

The mechanism for moving the carrier with relation to the knife embodies, as before intimated, an operating-arm which is adapted to coöperate with said carrier. This operating-arm is indicated in the drawings by the letter I, and at its outer end it is provided with a clutch projection $i$, preferably in the form of a sharpened edge or pawl adapted to engage the periphery of the cheese-carrier, while at its opposite end it is extended at K to form a controlling-arm, preferably projecting through to the opposite side of the carrier and provided with a handle K', by which the arms may be swung on a pivot or center L. In order now to give the operating-arm a differential throw, the said pivot L is made adjustable toward or from the end of said arm, the said pivot being preferably mounted on a pivot-carrier N, pivoted at one end to the base A and at the opposite end connected with a controlling and indicating extension O, which latter is adapted to register with a series of graduations on a scale-plate P and to be locked in adjusted position by a set-screw O' at its outer end beyond the periphery of the cheese-carrier, as shown clearly in Fig. 1.

In order that the arc described by the extension O may coincide with the curvature of the base A, the said extension O is preferably formed as a portion of a lever $O^2$, which is pivoted centrally of the base on the radial arms A' and connected by a link $O^3$ with the end of the fulcrum or pivot-carrier N. Thus by the shifting of the controlling lever or extension O the said fulcrum or pivot of the operating-arm may be shifted toward or from the end of the said arm, thereby lengthening or shortening the same and correspondingly increasing or diminishing the length of its stroke or throw.

For arresting the movement of the operating-arm and handle at each end of its maximum stroke or throw stops are provided, preferably adapted to coöperate with the controlling-arm K, such stops being indicated at $k$ at the front of the base A. The controlling-arm is also preferably confined beneath a gage or guide-plate $k'$, having on its under surface a series of notches dividing it into four parts, each of which is equal to a division of the cheese corresponding to a quarter of a pound in weight. Thus if the controlling-arm be moved a full stroke between the stops it will move the operating-arm a distance proper to rotate the carrier for the knife to remove a segment of the cheese one pound in weight; but if moved to the first notch only the movement of the carrier will be sufficient for the knife to remove a segment of the cheese of one-quarter of a pound weight. The second notch corresponds to a half-pound and the third notch to three-quarters of a pound. With this arrangement the salesman or operator can either by observation or by feeling when the controlling-lever passes over one of the notches determine when the controlling-arm has been moved a proper distance for advancing the cheese to sever either a quarter, half, three-quarters, or a whole pound, as desired.

The scale P is provided with graduations numbered to correspond to the total weight of the cheeses to be cut by the apparatus and is of a capacity equal to the range of weights in commercial cheeses of a size within the capacity of the apparatus. Each graduation is so placed that when the fulcrum-controlling extension registers therewith the fulcrum of the operating-arm will be in position to give a throw to said arm sufficient to advance the carrier a proper distance for the knife in its descent to remove a segment of the desired weight from a cheese having a total weight corresponding with the graduation with which the extension registers. With thin cheese or cheese of small diameter the movement of the support will be greater than with a thick cheese or cheese of large diameter; but in any instance it will be found that the total weight of the cheese will indicate the correct graduation on the scale at which the fulcrum-controller is to be set, and so it is only necessary in setting the apparatus for the purpose of cutting aliquot parts of a cheese or fractions thereof to know the total weight of the cheese. With the apparatus set when the cheese is first placed in position the salesman need give no further thought to that part of the apparatus and it only remains for him to move the operating-lever back and forth in order to advance the cheese the proper distance for the knife to remove the exact quantity desired. By the provision of stops and notches for the operating-lever it is not even necessary for the salesman to look at the handle, as he can determine by the feel or by the click when to reverse the movement.

In use the clutch of the operating-arm of the apparatus illustrated is thrown into engagement by a longitudinal movement of the arm itself. Thus the salesman grasps the controlling-handle, pushes it inward, then moves it to the left, then draws it forward to clutch the periphery of the cheese-carrier, and swings it to the right, moving the carrier in unison with the end of the operating-arm. Having previously set the fulcrum of the operating-arm in accordance with the total weight of the cheese, it is obvious that the carrier will be advanced into position for the knife to sever the exact quantity desired.

The knife itself is preferably a flat blade and is left in contact with one face of the cheese, while a flat blade S is mounted in the carrier against the other face of the cheese, so as to effectually prevent evaporation, and thereby dispense with the necessity of employing a cover, although it is obvious that a suitable cover may be used where desired. It is further obvious that the particular type of clutch is immaterial, and instead of engaging the body of the carrier it may engage the metal portion of the carrier, so as to avoid wear.

Having thus described my invention, what I claim as new, and desire to secure by Letters Patent, is—

1. In a cheese-cutter the combination of the following instrumentalities, to wit; a carrier for the cheese, a knife movable toward and from the carrier and a mechanism for moving the carrier angularly with respect to the plane of movement of the knife, embodying an operating-arm having a variable throw, a controlling-handle therefor having a fixed maximum throw and means for regulating the throw of the operating-arm without varying the maximum throw of the handle; substantially as described.

2. In a cheese-cutter, the combination of the following instrumentalities, to wit; a carrier for the cheese mounted on a fixed center, a knife movable toward and from the carrier and a mechanism for rotating the carrier a variable distance on its center, embodying an operating-arm having a variable throw, a controlling-handle therefor and means for regulating the throw of the operating-arm without influencing the throw of its controlling-handle; substantially as described.

3. In a cheese-cutter, the combination of the following instrumentalities, to wit; a carrier for the cheese mounted to rotate on a center, a knife movable toward and from the carrier in a plane radial to the axis on which the carrier turns, and a mechanism for rotating the carrier embodying an arm having a movable fulcrum, a controlling mechanism for said fulcrum and a gage to indicate an adjustment corresponding to the total weight of the cheese; substantially as described.

4. In a cheese-cutter, the combination of the following instrumentalities, to wit; a carrier for the cheese mounted to rotate on a center, a knife movable toward and from the carrier in a plane radial to the axis of the carrier, an operating-arm for rotating the carrier, a controlling-handle connected therewith, a movable fulcrum for the operating-arm, means for shifting said fulcrum to vary the range of throw of the operating-arm and a gage for determining the throw of the operating-arm; substantially as described.

5. In a cheese-cutter, the combination with a rotary cheese-carrier and a knife movable toward and from the carrier, of an operating-arm for rotating the carrier, a controlling-handle connected therewith, a movable fulcrum for the operating-arm, a pivoted support for said fulcrum and a scale for determining the position of adjustment, substantially as described.

6. In a cheese-cutter, the combination with a rotary cheese-carrier and a knife movable toward and from the carrier, of an operating-arm for rotating the carrier, a clutch connection between the arm and carrier, a movable fulcrum for the operating-arm, means for adjusting said fulcrum; substantially as described.

7. In a cheese-cutter, the combination with a rotary cheese-carrier and a knife movable toward and from the carrier, of an operating-arm for rotating the carrier, stops for arresting the movement of said arm in each direction, an adjustable fulcrum for the arm and a scale for determining the position of adjustment; substantially as described.

8. In a cheese-cutter, the combination with a rotary cheese-carrier and a knife movable toward and from the carrier, of an operating-arm for the carrier, a controlling extension for said arm, a movable fulcrum for the arm, a fulcrum-carrier a controlling-lever for said carrier, a link connecting the fulcrum-carrier and controlling-lever and a scale with which the lever registers graduated to correspond to the total weight of the cheeses to be cut; substantially as described.

9. In a cheese-cutter, the combination with the knife, base, rotary carrier and mechanism for rotating the carrier mounted on the base, of a non-rotary spider carried by the base and overlying the rotating mechanism, a pivot connecting the spider and rotary carrier to center the latter and supports projecting through said spider to hold it in position and coöperating with the carrier remote from the pivot; substantially as described.

WILLIAM G. TEMPLETON.

Witnesses:
ALEXANDER S. STEWART,
ELIZABETH GRIFFITH.